United States Patent [19]

Blake

[11] Patent Number: 5,070,775
[45] Date of Patent: Dec. 10, 1991

[54] REMOVABLE COOKING SURFACE FOR THE MOVABLE PLATEN OF A TWO-SIDED COOKING DEVICE

[75] Inventor: John Blake, Louisville, Ky.

[73] Assignee: Bottomline Management, Inc., Louisville, Ky.

[21] Appl. No.: 639,026

[22] Filed: Jan. 9, 1991

[51] Int. Cl.$^5$ .............................................. A23L 1/01
[52] U.S. Cl. ........................................ 99/349; 99/422; 99/372; 228/177
[58] Field of Search ............... 99/349, 372, 422, 426; 219/98, 99; 29/525.1; 228/177, 182, 185

[56] References Cited

U.S. PATENT DOCUMENTS

| | | | |
|---|---|---|---|
| 3,313,230 | 4/1967 | SimJian | 99/372 |
| 3,978,780 | 9/1976 | Venelin | 99/422 |
| 4,217,817 | 8/1980 | Meamber | 99/349 |
| 4,345,514 | 8/1982 | Morley | 99/349 |
| 4,364,308 | 12/1982 | John | 99/372 |
| 4,562,329 | 12/1985 | Minton | 219/98 |
| 4,586,428 | 5/1986 | Adamson | 99/349 |
| 4,635,538 | 1/1987 | Polster | 99/349 |
| 4,697,504 | 10/1987 | Keating | 99/349 |
| 4,700,619 | 10/1987 | Scanlon | 99/349 |
| 4,702,159 | 10/1987 | Polster | 99/349 |
| 4,729,296 | 3/1988 | Sabin | 99/349 |
| 4,763,571 | 8/1988 | Berling | 99/349 |
| 4,987,827 | 1/1991 | Marquez | 99/349 |

Primary Examiner—Timothy F. Simone
Assistant Examiner—Terrence R. Till
Attorney, Agent, or Firm—Charles G. Lamb

[57] ABSTRACT

An improved removable cooking surface assembly for the upper movable heated platen of a two-sided cooking device includes a cooking surface device having a planar rigid heat-conducting metal platen with threaded studs bonded to its upper surface, the studs being aligned with bores in an upper movable heat platen, the heat-conducting plate being coated on its lower surface with a layer of non-stick synthetic coating. The coated platen is removably connected with a heated platen and extends in contiguous relation across the lower surface of the heated platen for uniform heat transfer from the heated platen to the coated platen and the food product being cooked. Following cooking of the food product, the upper platen is raised, and the food product remains on the lower grill surface because the coating of the upper surface prevents the product from sticking to the non-stick coating over the heated platen. After extended use, the cooking surface assembly is easily removed from the upper heated platen for refurbishing or replacement.

18 Claims, 1 Drawing Sheet

REMOVABLE COOKING SURFACE FOR THE MOVABLE PLATEN OF A TWO-SIDED COOKING DEVICE

BACKGROUND OF THE INVENTION

In the fast food industry, two-sided cooking grills are used to reduce the cooking times of hamburgers and the like, while providing uniform cooking to given specifications. Typically, two-sided cooking grills include a lower fixed grill and an upper heated platen pivotally connected with the lower grill for movement between opened and closed positions. When the movable platen is in the closed position, it is normally parallel to the fixed surface and in contact with the upper surface of the food product on the lower grill, whereby the product is cooked from both sides. The present invention relates to an improved removable cooking surface assembly for the upper movable platen.

BRIEF DESCRIPTION OF THE PRIOR ART

Two-sided cooking devices are well-known in the prior art as evidenced by U.S. Pat. No. 4,483,239 issued to Mueller et al, U.S. Pat. No. 4,601,237 issued to Harter et al, and U.S. Pat. No. 4,700,619 issued to John M. Scanlon. U.S. Pat. No. 4,483,239 discloses an adaptor for converting a conventional grill to a two-sided cooking grill. The adaptor includes a plate and a thin flexible skirt or film formed of non-stick material which covers the bottom cooking surface of the platen and which is removably connected with the adaptor by a retainer ring. A primary drawback of the U.S. Pat. No. 4,483,239 device is that the non-stick film does not provide a uniform transfer of heat from the surface of the heated plate to the food product because the film sags away from the central portion of the plate surface since the film is only retained at its edges about the side portion of the plate. With insufficient heat transfer, the food product is not properly seared which is normally required in fast food cooking.

U.S. Pat. No. 4,601,237 discloses an adjustable meat press for two-sided cooking. The upper movable platen of the meat press is coated with a layer of non-stick coating material to prevent the food product being cooked from sticking to the platen during cooking. After extended use, however, it is necessary to refurbish the non-stick coating on the movable platen. This requires removal and/or replacement of the entire movable platen, resulting in excessive downtime for the grill, as well as excessive cost.

U.S. Pat. No. 4,700,619 discloses a two-sided cooking device having a non-stick cooking surface assembly for the upper platen. The upper platen is rectangular in shape and includes a rigid rectangular aluminum plate having sharper corners or edges which is coated on one surface with a layer of non-stick material. The upper platen, the plate, and the layer of non-stick material are formed with aligned openings for receiving steel bolts which are used to rigidly connect the coated plate to the upper platen. The openings are beveled at the coated side of the plate and the heads of the bolts are tapered to conform with the beveled openings so that the bolt heads are flush with the lower surface of the coat of non-stick material on the plate. The bolts extend through openings in the upper platen and lock washers and nuts are threaded over the extending ends of the bolts to secure the coated plate to the upper platen. The non-stick cooking surface of U.S. Pat. No. 4,700,619 has a number of drawbacks. For example, the sharp edges on the periphery of the planar results in thinner coatings of non-stick materials. The heads of the bolts are tapered and thus have sharp perimeter edges and the mating beveled holes would also have sharp perimeter edges, these conditions prevent the application of a uniform coating thickness. The coating frays and peels and fails prematurely. Moreover, as the non-stick coating frays and peels at the bolt heads, food begins to stick and build up, thereby slowing the cooking cycle. Furthermore, bolt heads and mating surfaces are a natural breeding ground on the cooking surface for germs. At cooking temperature, the peripheral edge and planar surface of the coated plate tends to buckle and pull away from the upper heated platen because of the heat expansion differential between the upper aluminum heat platen, the aluminum planar and the bolts holding the coated plate to the upper platen which allows contamination of the interface between the coated plate and platen. Even further, excessive down time is experienced for installation because of the use of a plurality of bolts which have to be aligned with holes in both planar and the upper heat platen.

SUMMARY OF THE INVENTION

Accordingly, it is a primary object of the present invention to provide a cooking surface assembly for the upper movable heated platen of a two-sided cooking device including a planar plate of a rigid heat-conducting material, a continuous layer of a non-stick synthetic plastic material coating one surface and the sides of the lower surface of the plate for resisting adhesion of a food being cooked and a plurality of bolts welded to the coated plate with the non-coated surface of the plate for securing the coated plate to the platen in contiguous relation with the lower surface of the platen for uniform heat transfer from the platen to the plate and the layer of synthetic plastic material.

BRIEF DESCRIPTION OF THE FIGURES

The present invention will become even more clear upon reference to the following description in conjunction with the accompanying drawings, wherein like numerals refer to like parts throughout the several views and in which.

DETAILED DESCRIPTION

Figure 1:
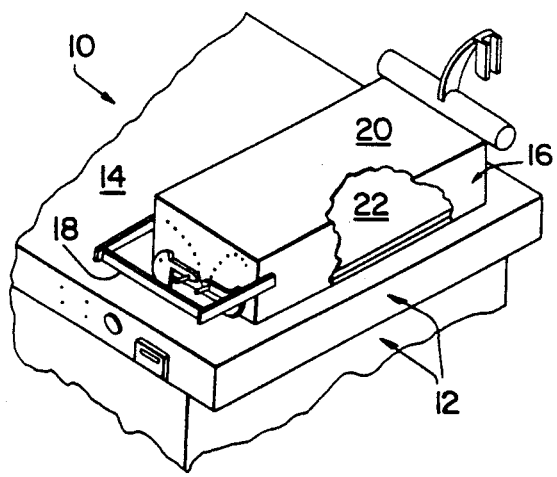
FIG. 1 is a partial perspective view of a two-sided cooking device including an upper movable heated platen and non-stick coated plate of the present invention.

A two-sided cooking device 10 is shown in FIG. 1. The device includes a lower fixed grill 12 having a planar horizontal lower cooking surface 14, and an upper movable heated cooking device 16 pivotally connected with the fixed grill 12 for movement between an open position wherein the upper device is pivoted upwardly from the lower cooking surface 14 and a pivoted downwardly closed position wherein the upper device 16 is located in parallel spaced relationship over the lower cooking surface. A food product on the grill 12 beneath the upper movable cooking device 16 is simultaneously cooked from both sides. A handle 18 is attached to the upper cooking device 16 for raising and lowering the upper cooking device. Appropriate stops (not shown) known to the art can be provided on the upper cooking device 16 to contact the lower cooking surface when the upper cooking device 16 is in the closed position to hold the upper cooking device 16 in spaced apart relationship over the lower grill 12.

The lower grill 12 is heated in various conventional manners such as by a gas or electric burner (not shown) beneath the lower cooking surface 14. Similarly, the upper cooking device 16 is also heated by, for example, an electrical resistance heating element. As shown, the upper cooking device 16 includes an open bottom housing 20, and a platen 22 received in the open bottom of the housing. The platen 22 is formed of a heat conducting metal, preferably aluminum, and has the electrical resistance heating element (not shown) embedded therein, so that the platen 22 is heated uniformly to a desired temperature. The heating element is operatively associated with controls (not shown) so that the temperature to which the platen 22 is to be heated can be controlled.

Figure 2:
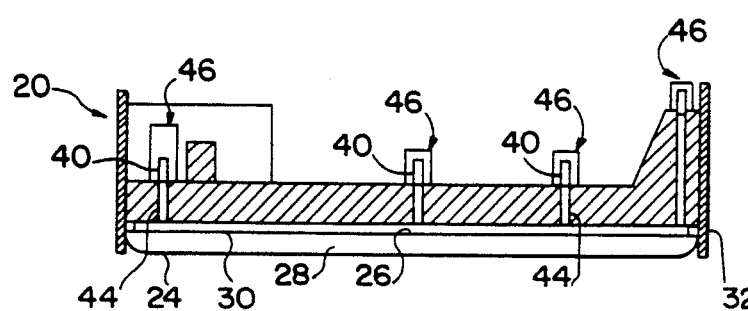
FIG. 2 is a cross-sectional side view of the platen and coated plate of the present invention.
Figure 3:
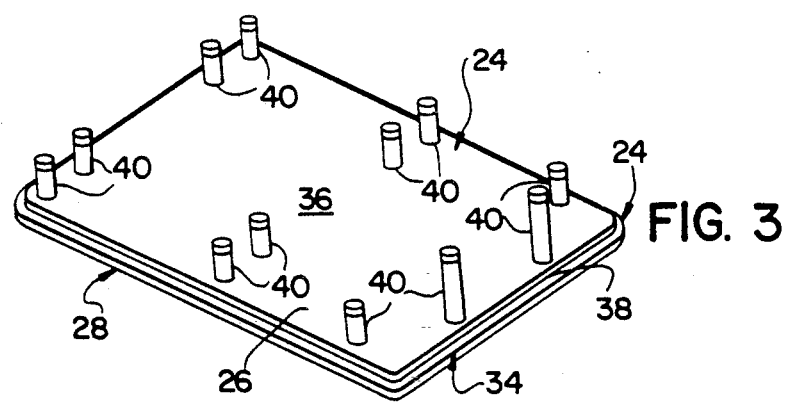
FIG. 3 is a perspective view of the removable coated plate of the present invention.
Figure 4:
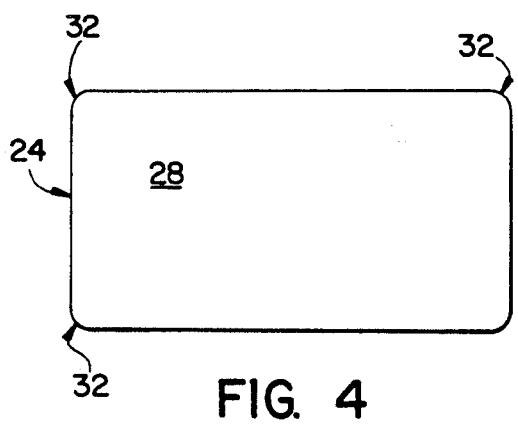
FIG. 4 is a bottom plan view of the removable coated plate of FIG. 3.

As shown in FIGS. 2 and 3, a non-stick cooking surface device 24 is removably connected with the platen 22 of the upper cooking device 16. The non-stick cooking surface device 24 includes a rigid planar plate 26 fabricated of a heat conducting metal such as aluminum. The plate 26 has a peripheral configuration corresponding with that of the platen 22, and is shown as being substantially rectangular. The peripheral edge of the plate 26 is radiused so that the side edges are curved and smoothly blend into the lower surface eliminating a sharp corner and the juncture of the side edges and top surface. A thin flat and smooth coating 28 of non-stick synthetic plastic material such as polytetrafluoroethylene is applied to the lower surface 30 and radiused peripheral edge 32 of the plate 22. A suitable adhesive is used to secure the layer of synthetic plastic material to the plate. Further, a peripheral step 34 is formed in the top surface 36 of the plate 26. With the plate 26 positioned on the platen 22, the peripheral step 34 and platen 22 cooperate to form a peripheral groove, and a peripheral seal 38 is located in the peripheral groove to prevent contamination of the interface of the top surface 36 of the plate 26 and platen 22 by grease or fat and the like. The plate 26 is of, for example, between 0.180 to 0.200 inches thick and the coating of non-stick synthetic plastic material 28 on the bottom surface 30 and peripheral curved edge 32 of the plate 26 is of a uniform thickness of, for example, 0.001 to 0.003 inches.

Figure 5:
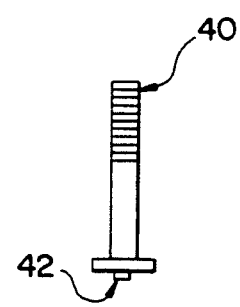
FIG. 5 is a side view of a fastener to be secured to the coated plate prior to being affixed to the coated plate.

Now with reference to FIGS. 2, 3, and 5, an array of threaded studs 40 are affixed to and project outwardly from the top surface 36 of the plate 26. The studs 40 are preferably aluminum and are welded to the plate. The studs 40 are welded to the top surface 36 of the plate 26 by a welding system utilizing the capacitor discharge principle. As can be best seen in FIG. 5, the studs 40 are of unitary construction and have a small projection 42 on the end thereof to be welded to the plate 26. The studs 40 are positioned with the projection 42 against the top surface 36 of the plate 26 and are welded to the top surface 36 by either the contact or gap method. Heat for fusion is obtained from an electric arc which is established by flashing away the projection 42. The discharge of the welding current or energy stored in the capacitor produces an electric arc which melts the end of the stud 40 and a portion of the top surface 36 of the plate 26 beneath the stud end. The stud 40 is forced into the molten metal of the top surface 36 of the plate 26 before the conclusion of the welding arc cycle and upon cooling a uniform cross-section weld is produced. A particular advantage of the capacitor discharge method is that the limited heat generated and shallow heat penetration into the plate 26 is that the studs 40 are welded to the relatively thin plate 26 without marking the bottom surface 30 of the plate 26 and without effecting the thin coating 28 of non-stick synthetic material over the bottom surface 30. An amperage of 30,000 amps at 250 volts provides a welding time of 3.5 milliseconds.

The platen 22 is formed with an array of stud-receiving bores 44 equal in number and pattern to the array of studs 40 welded to the plate 26. The top surface 36 of the plate 26 is positioned against the platen 22 with the studs 40 projecting through the bores 44. The plate 26 is removably secured to the plate 22 by means of aluminum cap nuts 46 threaded over the protruding ends of the studs 40. Furthermore, because the studs 40 are welded to the plate 26, this provides a quick and easy means for installing. Also, the cap nuts 46 are tightened sufficiently to seal the threaded stud from contamination between the plate 26 and the upper heat platen 22.

The cooking surface device 24 is easily removed from the platen 22 by removing the nuts 46 from the studs 40. Therefore, after extended use, the cooking surface device 24 can be removed from the platen 22 and a new or refurbished assembly reinstalled. The original cooking surface device 24 can then be refurbished by grit blasting the coating of non-stick material 28 from the plate 26 and covering the plate 26 with a new coating.

The foregoing detailed description is given primarily for clearness of understanding and no unnecessary limitations are to be understood therefrom for modifications will become obvious to those skilled in the art and may be made without departing from the spirit of the invention and scope of the appended claims.

What is claimed is:

1. A cooking surface device for the upper movable heated platen of a two-sided cooking device, comprising:
    a planar plate of a relatively high heat conducting material, said plate having an upper and lower surface and radiused peripheral side edge arcuately blending with the lower surface of the plate;
    a layer of synthetic material coating the lower surface and the radiused peripheral edge of said plate; and,
    a plurality of threaded studs welded to and projecting from the upper surface of said plate.

2. The cooking surface device of claim 1, including a heated platen formed with a plurality of bores, said bores receiving the studs therethrough when the plate is positioned over the platen.

3. The cooking surface of claim 1, wherein the studs are fabricated of aluminum, and the plate is fabricated of aluminum.

4. The cooking surface device of claim 1, wherein the top surface of the plate is formed with a peripheral step which cooperates with the platen when the plate is positioned on the platen to define a seal-receiving groove; and, a seal disposed in the groove.

5. The cooking surface device of claim 1, wherein the threaded studs are of unitary construction.

6. The cooking surface device of claim 1, further comprising nuts threaded over the studs for removably attaching the plate to the platen.

7. The cooking surface device of claim 1, wherein the studs are fabricated of aluminum, the plate is fabricated of aluminum, and the platen is fabricated of aluminum.

8. The cooking surface device of claim 1, wherein the studs are formed with a projection at the end thereof to be welded to the top surface of the plate.

9. The cooking surface device of claim 1, wherein the studs are welded to the plate by capacitor discharge.

10. The cooking surface device of claim 9, wherein the capacitor discharge is about 30,000 amps at 250 volts.

11. The cooking surface device of claim 1, wherein said layer of synthetic coating is flat and smooth.

12. The cooking surface device of claim 2, wherein said planar plate includes a peripheral groove circumferentially thereof and a peripheral seal therein, whereby contamination between the planar plate and the heated platen is prevented.

13. A method of making a cooking surface device for the upper movable heated platen of a two-sided cooking device comprising the steps of:

radiusing the side edges of a relatively high heat-conducting plate, the terminating radius edge defining the periphery of a lower surface of said plate, said plate having an upper surface being the same circumferential configuration of said upper movable platen;

applying a thin coating of a non-stick synthetic material to said lower surface of said plate; and, welding threaded studs to the upper surface of said plate, said studs being positioned to align with stud-receiving bores in said plate.

14. The method of claim 13, wherein said plate, said platen, and said studs are of the same materials of construction.

15. The method of claim 13, wherein said non-stick synthetic coating is polytetrafluoroethylene.

16. The method of claim 13, wherein said bonding includes welding said studs to said plate with a capacitor discharge.

17. The method of claim 14, wherein said materials of construction includes aluminum.

18. The method of claim 16, wherein said capacitor discharge is at an amperage of about 30,000 amps and 250 volts for about 3.5 milliseconds.

* * * * *